United States Patent [19]

Trä

[11] 4,017,033

[45] Apr. 12, 1977

[54] APPARATUS AND METHOD FOR RECLAIMING WASTE PAPERS

[75] Inventor: Josef Trä, Heidenheim, Germany

[73] Assignee: J. M. Voith GmbH, Heidenheim (Brenz), Germany

[22] Filed: Mar. 25, 1976

[21] Appl. No.: 670,353

[30] Foreign Application Priority Data

Mar. 29, 1975 Germany .......................... 2514162

[52] U.S. Cl. .................... 241/28; 241/29; 241/45; 162/4; 162/8

[51] Int. Cl.² .......................................... B02C 23/38

[58] Field of Search .............. 162/4, 8, 55; 241/28, 241/29, 43, 45, 46.17, 46.11; 209/3, 17, 211

[56] References Cited

UNITED STATES PATENTS

| 3,086,717 | 4/1963 | Vroom et al. | 241/28 |
| 3,411,720 | 11/1968 | Jones et al. | 241/28 |
| 3,595,488 | 7/1971 | Blakley et al. | 241/28 |
| 3,736,223 | 5/1973 | Marsh | 162/4 |
| 3,833,465 | 9/1974 | Campbell | 241/28 |
| 3,844,488 | 10/1974 | Neitzel | 241/43 |
| 3,849,245 | 11/1974 | Marsh et al. | 162/4 |
| 3,859,206 | 1/1975 | Baggaley | 209/211 |
| 3,928,186 | 12/1975 | Zemanek | 209/211 |
| 3,942,728 | 3/1976 | Christ et al. | 209/211 |

FOREIGN PATENTS OR APPLICATIONS 965,806  6/1957  Germany

OTHER PUBLICATIONS

"Handbook of Pulp and Paper Technology," Kenneth W. Britt; Reinhold Publishing Corporation, 1964, p. 220.

Primary Examiner—S. Leon Bashore
Assistant Examiner—Peter F. Kratz
Attorney, Agent, or Firm—Peter K. Kontler; John Kurucz

[57] ABSTRACT

Disclosure is made of improved apparatus for continuously processing waste papers, contaminated with inks, adhesives, resins, groundwood, foreign objects, paper fasteners and the like, into usable grades of cellulosic fiber pulps. The disclosure is also of a method for the continuous processing of contaminated waste papers into nearly quantitative yields of usable cellulosic fiber pulps.

15 Claims, 1 Drawing Figure

U.S. Patent April 12, 1977 4,017,033
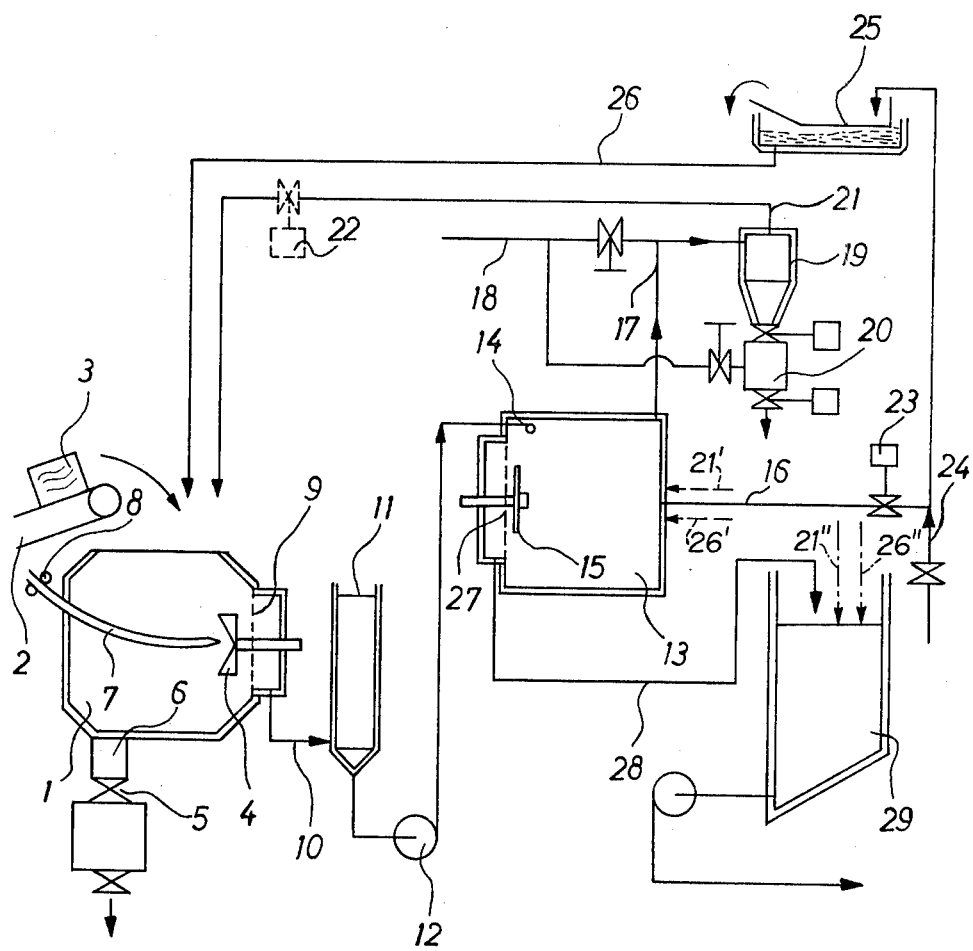

APPARATUS AND METHOD FOR RECLAIMING WASTE PAPERS

BACKGROUND OF THE INVENTION

1. Field of the Invention

The invention relates to methods and apparatus for reclamation of cellulosic fiber materials and more particularly concerns the conversion of waste papers to cellulosic fiber pulp.

2. Brief Description of the Prior Art

Paper stock from reclaimed waste papers comprises the second largest source of fibrous raw material for paper making after wood pulps. Reclaimed waste paper is of great interest as a means of saving our natural resources and for reducing the impact of waste paper on the ecology. Although numerous methods and devices have been developed to convert waste papers to usable fibrous pulps, most depend on careful segregation and classification of the waste materials to obtain clean, high quality pulps. However, waste papers are generally delivered to the paper mills from a wide variety of sources. The lots of waste paper are of varying fibrous constituency and contain indeterminate and widely varying quantities of groundwood in the papers. In addition, the papers often carry widely varying amounts and kinds of resins, metallic foils, dyes, inks, sizing, metallic fasteners, adhesives, fillers, binding cords and like contaminants. Careful sorting, classification and segregation of the delivered waste in an onerous if not impossible task. Accordingly, there exists a need for apparatus and methods of taking unsorted, unsegregated, mixed paper materials including unwanted contaminants and processing the same into high grade fibrous pulps.

Heretofore, apparatus was available which had the capability of processing unsorted and mixed lots of waste papers in the preparation of fibrous pulps; see for example the disclosure of U.S. Pat. No. 3,844,488. Such apparatus generally comprises a slusher, a fiberizer - (or also called pulper or grader) operated under pressure and a variety of sieves and holding tanks. In operation, the unsorted papers are slushed in the slusher wherein many of the gross contaminants such as wires and metallic fasteners are separated. The slush is then carried to the pressurized fiberizer for further separation of the contaminants and fiber liberation. After a period of slushing and fiberizing the resulting pulp is sieved and processed further. One of the problems associated with the prior art methods and apparatus concerns the difficulty of separating the liberated fibers from the contaminants. For example, there is a tendency for the relatively heavy contaminants to entrain substantial proportions of partially liberated fibrous materials. Upon separation of heavy contaminants from the pressurized fiberizer, substantial amounts of fibrous materials are lost from the fiberizer and consequently from the product pulp. It has been estimated that from 10 to 20 percent by weight of fibrous material is lost from the product pulp in this manner. Previously it was sought to solve this problem by recirculating the heavy contaminants through the fiberizer or by increasing the residence time of the heavy contaminants in the fiberizer to effect a greater separation of the entrained fibrous materials. The disadvantage of these approaches resides in the additional wear and tear on the fiberizer caused by the prolonged presence of the heavy contaminants therein.

The above described problems of the prior art are solved by the apparatus and method of my invention. The apparatus and method of the invention provide a highly efficient means of processing grossly contaminated waste papers into high quality, cellulosic fiber pulps with a high proportion of unbroken fibers, in near quantitative yields.

SUMMARY OF THE INVENTION

The invention comprises, apparatus for processing contaminated waste paper into a cellulosic fibrous pulp, which comprises;

a slusher for slushing said waste paper;

a pressure-operated fiberizer for liberating fibers from slushed waste paper, and fiberizer being adapted to continuously separate liberated fiber, light waste paper contaminants mixed with fibrous cellulosic material and heavy waste paper contaminants mixed with fibrous cellulosic material;

means connected to said slusher, for delivering waste paper slush produced in said slusher to said fiberizer;

means for separating liberated fiber substantially free of contaminants, from said fiberizer;

means for receiving the separated, liberated fiber;

a centrifugal separator adapted to separate heavy waste paper contaminants from mixtures thereof with fibrous cellulosic materials;

means communicating between said fiberizer and said centrifugal separator for conveying the separated heavy waste paper contaminants mixed with fibrous cellulose material from said fiberizer to said centrifugal separator;

means for recycling fibrous cellulosic materials separated in said centrifugal separator, to said means for receiving the separated, liberated fiber;

a separator adapted to separate light waste paper contaminants from mixtures thereof with fibrous cellulosic materials;

means communicating between said fiberizer and said separator adapted to separate light waste paper contaminants, for conveying said mixtures of light waste paper contaminants with fibrous cellulosic materials from said fiberizer to said separator adapted to separate light waste paper contaminants; and means for recycling fibrous cellulosic materials separated in said separator adapted to separate light waste paper contaminants, to said means for receiving the separated liberated fiber.

The invention also comprises a method for the continuous processing of contaminated waste paper into a usable cellulosic fiber pulp, which comprises;

a. slushing the contaminated waste paper with water;

b. continuously making a first separation of gross contaminants from the slushed waste paper;

c. continuously liberating cellulosic fibers from the slushed waste paper separated in said first separation, whereby a mixture is obtained which comprises light contaminants, heavy contaminants and liberated cellulosic fibers;

d. continuously separating said mixture into
  1. a substantially contaminant free cellulosic fiber pulp;
  2. a mixture of light contaminants with fibrous cellulosic material; and
  3. a mixture of heavy contaminants with fibrous cellulosic material;

e. separating the light contaminants from the mixture (2) above;

f. continuously separating the heavy contaminants from the mixture (3) above; and g. continuously mixing the fibrous cellulosic material obtained in at least one of steps (e) and (f) to the slushed waste paper of step (b) above.

The term "contaminated waste paper" as used throughout the specification and claims means paper and waste paper products in the generic sense as inclusive of products deposited from a suspension of cellulose fibers, irrespective of the type of stock and thickness, in admixture with non-cellulosic contaminants which are undesirable in a cellulosic fiber pulp. Such contaminants include, but are not limited to, gross contaminants such as baling wires, binding cords, metallic foils, plastics fasteners and the like; integrated contaminants such as dyes, inks, sizing, adhesives, fillers and the like.

The term "light waste paper contaminants" is used herein to mean the relatively light contaminants and the term "heavy waste paper contaminants" is used to mean the relatively heavy contaminants, each type of contaminant being light or heavy relative to the other in regard to specific gravity.

The term "continuous processing of contaminated waste paper into usable cellulose fiber pulp" as used herein means a process wherein usable cellulose fiber pulp is continuously produced from a continuous supply of contaminated waste paper.

BRIEF DESCRIPTION OF THE DRAWINGS

The accompanying drawing is a schematic view of the apparatus and method of the invention.

DETAILED DESCRIPTION OF THE PREFERRED EMBODIMENTS

A complete understanding of the invention may be readily obtained by referring to the preferred embodiments shown in the accompanying drawing, in conjunction with the following specification. The drawing shows slusher 1, which is fundamentally a tank, open at its top. The purpose of the slusher is to receive bales 3 of contaminated waste paper shown delivered by conveyor 2 through the open top and to convert the waste paper to a slush by soaking in an aqueous solution. Slusher 1 holds water for soaking the waste paper 3 received. An impellor 4 agitates the mixture of water and contaminated waste paper and comminutes the waste paper into smaller particles. As the waste paper is slushed, heavy gross contaminants settle to the bottom of slusher 1 and may be separated away by outlet 6 at the base of the slusher 1. Outlet 6 is controlled with a shut-off valve 5. Other contaminants such as wire, cords and the like circulate in the interior of slusher 1 under the agitation of impellor 4. These circulating contaminants are captured by ragger rope 7. Ragger rope 7 is withdrawably inserted through a portal in the casing of slusher 1 and may be withdrawn from the interior of slusher 1 by retracting mechanism 8. Retracting mechanism 8 may comprise a pair of power driven rollers. In operation, the circulating contaminant wires and cords wind themselves on ragger rope 7. The ragger rope 7 is only necessary at the beginning of the operation. During operation these impurity components become entangled so as to form themselves rope-like wads, which can be withdrawn from the slusher. A sieve 9 is mounted behind impellor 4. The coarse, comminuated paper in the slush passes through sieve 9 and then by conduit 10 is conveyed to holding tank 11. In a preferred apparatus slush is continuously passed to holding tank 11. Slusher 1 is a conventional component known in the art; see German Patent 965,806.

The apparatus of the invention includes a pressure operated fiberizer 13 for further slushing and liberating fibers from the slushed paper materials delivered by conduit 14 from holding tank 11. Pump 12 is a pressure feed device permitting the continuous delivery of slushed waste paper from holding tank 11 to fiberizer 13. Preferably, delivery of the slushed material to fiberizer 13 is tangentially of the chamber within pressurized fiberizer 13. Fiberizer 13 operates under pressure to effect the liberation of fibers from slushed materials delivered therein. The pressure in fiberizer 13 is approximately 15 to 40 meters of water (1.5 to 4 atmospheres of pressure). An impellor 15 creates a helical turbulence or stream in fiberizer 13, in such a way that the lighter contaminants associated with the comminuted and slushed waste paper are distributed and separated for evacuation through central conduit 16. The separation is generally incomplete in that light contaminants passing into conduit 16 entrain some fibrous cellulosic materials. Accordingly, conduit 16 conveys the light contaminants with fibrous material to a vibratory sieve 25 wherein the light contaminants are separated from the flow and retained on the sieve surface. The cellulosic fibrous materials in suspension pass through the sieve 25 and into conduit 26 for recycling to slusher 1. This recycled cellulosic fiber material is then carried through the fiberizer again for reclamation with liberated fibers. As shown in the drawing, the flow of material through conduit 16 may be controlled by a valve 23 when desired. Valve 23 may be left open so that the flow of material to sieve 25 is continuous. Valve 24 entering into conduit 16 may provide water for dilution of the suspension travelling to the sieve 25. In an alternate embodiment, the shut-off valve 23 may be replaced with a valve which allows for continuous separation of the light weight contaminants in metered quantities.

The turbulence in fiberizer 13 separates and distributes the heavier contaminants (also entrained fibrous cellulosic materials) to the periphery of the fiberizer 13 where evacuation occurs through conduit 17. The mixture of relatively heavy contaminants with fibrous cellulosic material carried in conduit 17 is maintained under elevated pressure substantially equal to that found in the periphery of the fiberizer 13. The mixture is continuously passed through the cyclone tank 19. The consistency of the mixture entering cyclone tank 19 may be reduced when desired by water admitted from conduit 18. The mixture of heavy contaminants and entrained fibrous cellulosic materials enters cyclone tank 19 under pressure and at high speed. The cyclone shape of the tank 19 causes the high speed inflow to create a vortex flow within the tank, creating high speed centrifugal forces. The heavy contaminants carried by the mixture are separated under the centrifugal force and accumulate in the lower, funnel shaped portion of the tank 19. The heavy contaminants may be removed through the bottom outlet 20. The separated and cleaned fibrous material remaining in the tank 19 is discharged therefrom through the conduit 21. The outlet conduit for cleaned cellulosic fiber material discharges in accordance with the invention into the pressure free slusher 1 for recycling ultimately to the fiberizer 13 wherein it may be further treated for reclamation.

In an alternate embodiment, the conduit 21 may contain a regulating valve 22. This renders it possible to meter the recirculation or recycling of the suspension travelling in the conduit 21.

As described above, cellulosic fibrous materials which are separated from the light and heavy contaminants in the sieve 25 or cyclone tank 19 are recycled through the slusher 1. Alternatively, the conduits 21 and 26 may discharge directly into the fiberizer 13, bypassing the slusher 1 (see the conduits 21', 26' which are indicated by broken lines). A preferred locus for introduction of the recycled suspension into the fiberizer 13 is into a low-pressure region of the fiberizer, e.g., at a locus close to the central axis of the fiberizer or close to the outlet conduit 16 for removal of the light weight contaminants. If the extent of defiberization of the suspension is sufficient, conduits 21 and 26 may also discharge their contents directly into holding tank 29 (see the conduits 21'', 26'' which are indicated by phantom lines). Holding tank 29 receives from conduit 28 a slurry of liberated fibers which are separated from fiberizer 13 by passage through sieve 27 located behind impellor 15. The fiberized and liberated material passing through conduit 28 is the high grade cellulosic fiber pulp, substantially free of contaminants. This pulp, after a period of time in holding tank 29 may be pumped directly for use, i.e.; for mixture with virgin pulps, bleaching, further refinement, or conversion into paper products.

The continuous method of the invention is carried out by first slushing the contaminated waste paper with water. The water may be made alkaline if desired. The slush prepared may be in any desired consistency, advantageous for suspending the paper. Generally an advantageous slush will have a consistency of from 0.5 to 10 percent based on dry waste paper. Gross contaminants, i.e.; wire, metals and like artifacts continuously precipitate from the slush and are separated therefrom by gravity.

The slush is then subjected to beating under pressure to liberate fibers from the slushed paper. In a pressure-operated fiberizer such as fiberizer 13, separation of liberated fibers from contaminants is carried on nearly simultaneously with fiber liberation and continuously. As previously described, the next step of the method of the invention is a separation, conveniently effected in fiberizer 13, of the fiberized mixture into a suspension of substantially uncontaminated fibrous pulp, a mixture of light contaminants with coarse cellulosic fibers and a mixture of relatively heavy contaminants with coarse cullulosic fibers. The uncontaminated cellulosic fibers in water (a suspension) are immediately isolated from the fiberized mixture. The mixture of light contaminants and cellulosic fibers is also separated from the fiberized mixture and itself separated to recover the entrained cellulosic fiber material. The recovered cellulosic fiber material is then admixed with slush for reprocessing according to the method of the invention. Of course if the recovered cellulosic fiber is in itself of a quality and state of defiberization permitting, it may be added to the fiberized mixture rather than to raw slush or even to the desired fiber suspension previously separated from the fiberized mixture.

In the method of the invention, the heavy contaminants with entrained cellulosic fiber material are continuously separated from the fiberized mixture and carried to a centrifugal separator for efficient separation of the heavy contaminants. In a preferred embodiment, separation is effected in a cyclone tank. Referring to the drawing, the preferred separation is illustrated in that the mixture of heavy contaminants and fiber material is delivered to a cyclone tank 19 via conduit 17, under pressure. The pressure is the pressure maintained in the periphery of the fiberizer 13. The consistency of the suspension in conduit 17 may be adjusted by introduction of water from conduit 18, so that the consistency of the mixture in cyclone tank 19 is advantageously that encouraging the development of a high speed vortex in cyclone tank 19. Generally the lower the consistency, the more efficient will be the separation in cyclone tank 19.

Following separation on the centrifugal separator, the desired cellulosic fiber is discharged through conduit 21 under reduced pressure (there is generally a pressure drop of circa 10–30 meters of water between the inlet and the outlet of cyclone tank 19) where it may be recycled into the process of the invention for further processing as described for the fibrous material separated from light contaminants or, if quality permits, admixed with the previously separated and desired fibre suspension.

The method of the invention may be carried out under a very broad range of conditions. Generally temperature is not critical; normal ambient temperatures may prevail at all steps (circa 20° C.–40° C. being preferred). Likewise, residence times in each step of the process of the invention are not critical and will depend somewhat on the properties of the paper entering the slusher and the degree and kinds of contamination. Since there is a continuous recycling of fibrous material until it meets the specifications desired of the fibre suspension, residence times at any particular stage are not critical.

Those skilled in the art will appreciate that many modifications of the method and apparatus disclosed herein may be made without departing from the spirit of the invention. For example, the contaminated waste papers may be subjected to additional deinking or dewaxing steps prior to refining.

What is claimed:

1. Apparatus for processing contaminated waste paper into a cellulosic fibrous pulp, which comprises;
   a slusher for slushing said waste paper;
   a pressure-operated fiberizer for liberating fibers from slushed waste paper, said fiberizer being adapted to continuously separate liberated fiber, light waste paper contaminants mixed with fibrous cellulosic material and heavy waste paper contaminants mixed with fibrous cellulosic material;
   means connected to said slusher, for delivering waste paper slush produced in said slusher to said fiberizer;
   means for separating liberated fiber substantially free of contaminants, from said fiberizer;
   means for receiving the separated, liberated fiber;
   a centrifugal separator adapted to separate heavy waste paper contaminants from mixtures thereof with fibrous cellulosic materials;
   means communicating between said fiberizer and said centrifugal separator for conveying the separated heavy waste paper contaminants mixed with fibrous cellulose material in pressurized condition directly from said fiberizer to said centrifugal separator;

means for recycling fibrous cellulosic materials separated in said centrifugal separator, to said means for receiving the separated, liberated fiber;

a separator adapted to separate light waste paper contaminants from mixtures thereof with fibrous cellulosic materials;

means communicating between said fiberizer and said separator adapted to separate light waste paper contaminants, for conveying said mixtures of light waste paper contaminants with fibrous cellulosic materials from said fiberizer to said separator adapted to separate light waste paper contaminants; and means for recycling fibrous cellulosic materials separated in said separator adapted to separate light waste paper contaminants, to said means for receiving the separated, liberated fiber.

2. Apparatus according to claim 1 wherein said centrifugal separator is a cyclone tank.

3. Apparatus according to claim 1 wherein said means for conveying the separated heavy waste paper contaminants mixed with fibrous cellulose material from said fiberizer to said centrifugal separator is a closed conduit.

4. Apparatus according to claim 1 wherein at least one of said means for recycling is a conduit delivering said fibrous cellulosic material to said slusher.

5. Apparatus according to claim 1 wherein at least one of said means for recycling is a conduit delivering said fibrous cellulosic material to said fiberizer.

6. Apparatus according to claim 1 wherein at least one of said means of recycling is a conduit delivering said fibrous cellulosic material to said means for receiving the separated, liberated fiber.

7. Apparatus for processing contaminated waste paper into a fibre suspension, which comprises;
a pressure-free slusher which includes a first impellor for comminution of the waste paper, a sieve mounted behind said impellor, an open portal behind said sieve for evacuation of the slushed and comminuted paper, means in the bottom thereof for separating heavy contaminants,
an outlet means for withdrawal of impurity components which become entangled so as to form rope-like wads,
a pressure-operated fiberizer for further slushing and liberating cellulosic fibers which include an impellor for creating a helical flow in said fiberizer, a classifying sieve mounted behind said second impellor, an open first portal in the wall of said fiberizer located behind said classifying sieve for evacuation of liberated cellulosic fibers, a second open portal in the wall of said fiberizer located opposite said second impellor for evacuating light contaminants, an open third portal in the wall of said fiberizer located at the periphery of said fiberizer for evacuating heavy contaminants, and an open inlet portal;
a first conduit connecting the open portal of said slusher with the inlet portal of said fiberizer whereby slushed paper is delivered to said fiberizer;

a cyclone tank separator for the separation of heavy contaminants from cellulosic fibrous material, having an inlet and an outlet portal;
a second conduit sealingly connecting said third portal directly to the inlet portal of said cyclone tank separator; and
a third conduit connected to the outlet portal of said cyclone tank separator for receiving separated cellulosic fibrous material from said cyclone tank separator.

8. The apparatus of claim 7 wherein said third conduit delivers said material into said slusher.

9. The apparatus of claim 7 wherein said third conduit delivers said material into said fiberizer.

10. The apparatus of claim 7 which further comprises means for introducing water into said second conduit.

11. The apparatus of claim 7 wherein said third conduit includes a regulating valve.

12. The apparatus of claim 7 which further comprises;
a second classifying sieve having an inlet and an outlet for evacuating separated cellulosic fibrous matter;
a fourth conduit connecting said second open portal in said fiberizer to the inlet in said second classifying sieve; and
a fifth conduit connected to the outlet of said second classifying sieve, said fourth conduit including means for opening and closing said fourth conduit.

13. Apparatus according to claim 12 wherein said fifth conduit delivers the separated cellulosic fibrous matter to said slusher.

14. Apparatus according to claim 12 wherein said fifth conduit delivers the separated cellulosic fibrous matter to said fiberizer.

15. A method of continuously processing contaminated waste paper into a usable cellulosic fiber pulp, which comprises
  A. slushing the contaminated waste paper with water;
  B. continuously making a first separation of gross contaminants from the slushed waste paper;
  C. continuously liberating cellulosic fibers from the slushed waste paper separated in said first separation, whereby a mixture is obtained which comprises light contaminants, heavy contaminants and liberated cellulosic fibers;
  D. continuously separating said mixture at a first location into
    1. A substantially contaminant free cellulosic fiber pulp;
    2. a mixture of light contaminants with fibrous cellulosic material; and
    3. a pressurized mixture of heavy contaminants with fibrous cellulosic material;
  E. separating the light contaminants from the mixture (2) above;
  F. conveying the pressurized mixture (3) above from said first location directly to a second location;
  G. continuously separating the heavy contaminants from the mixture (3) above at said second location; and
  H. continuously mixing the fibrous cellulosic material obtained in at least one of the steps (E) and (G) with the slushed waste paper.

* * * * *